(12) United States Patent
Park et al.

(10) Patent No.: US 10,108,341 B2
(45) Date of Patent: Oct. 23, 2018

(54) MOBILE TERMINAL AND DELETED INFORMATION MANAGING METHOD THEREOF

(71) Applicant: LG ELECTRONICS INC., Seoul (KR)

(72) Inventors: Mihyun Park, Seoul (KR); Hyewon Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 459 days.

(21) Appl. No.: 14/838,775

(22) Filed: Aug. 28, 2015

(65) Prior Publication Data

US 2016/0062668 A1    Mar. 3, 2016

(30) Foreign Application Priority Data

Aug. 29, 2014  (KR) .................. 10-2014-0114379

(51) Int. Cl.

| | |
|---|---|
| *G06F 3/048* | (2013.01) |
| *G06F 3/06* | (2006.01) |
| *G06F 17/30* | (2006.01) |
| *G06F 3/0484* | (2013.01) |
| *G06F 11/14* | (2006.01) |
| *G06F 11/07* | (2006.01) |

(52) U.S. Cl.
CPC ........ *G06F 3/0608* (2013.01); *G06F 3/04842* (2013.01); *G06F 3/04847* (2013.01); *G06F 3/0652* (2013.01); *G06F 3/0673* (2013.01); *G06F 17/30117* (2013.01); *G06F 11/0793* (2013.01); *G06F 11/1451* (2013.01); *G06F 11/1469* (2013.01)

(58) Field of Classification Search
None
See application file for complete search history.

(56) References Cited

U.S. PATENT DOCUMENTS

| | | | |
|---|---|---|---|
| 2004/0122873 A1 | 6/2004 | Wright, Jr. et al. | |
| 2005/0149571 A1* | 7/2005 | Jeon ................. | G06F 17/30067 |
| 2008/0092046 A1 | 4/2008 | Bae | |
| 2014/0237402 A1* | 8/2014 | Pang ................. | G06F 3/04817 |
| | | | 715/765 |

(Continued)

OTHER PUBLICATIONS

Lucas Mearian, Mirroring Cuts Data Center's Recovery Time, Mar. 11, 2002, Computerworld, Edition or vol. 36, 11; p. 38 ( Year: 2002).*

(Continued)

*Primary Examiner* — Tam T Tran
(74) *Attorney, Agent, or Firm* — KED & Associates, LLP

(57) ABSTRACT

The present invention relates to a mobile terminal, and more particularly, to a mobile terminal capable of checking and restoring deleted data in a convenient manner, and a method for managing deleted information thereof. The method for managing deleted information of a mobile terminal includes: sensing a deletion command with respect to content; inputting a setting of a deletion history; deleting corresponding content according to the input setting of the deletion history, and storing the deletion history; and displaying the stored deletion history together with other content which has not been deleted.

18 Claims, 25 Drawing Sheets

(56) References Cited

U.S. PATENT DOCUMENTS

2014/0279756 A1* 9/2014 Whitman .......... G06F 17/30572
706/12
2014/0331175 A1* 11/2014 Mesguich Havilio ......................
G06F 3/04883
715/808

OTHER PUBLICATIONS

Shane Schick, BlackBerry is ripe for success, Dec. 17, 1999, Computer Dealer News, Edition or vol. 15, 48; pp. 43-44 (Year: 1999).*

Extended European Search Report for Application 15182741.7 dated Nov. 23, 2015.

* cited by examiner

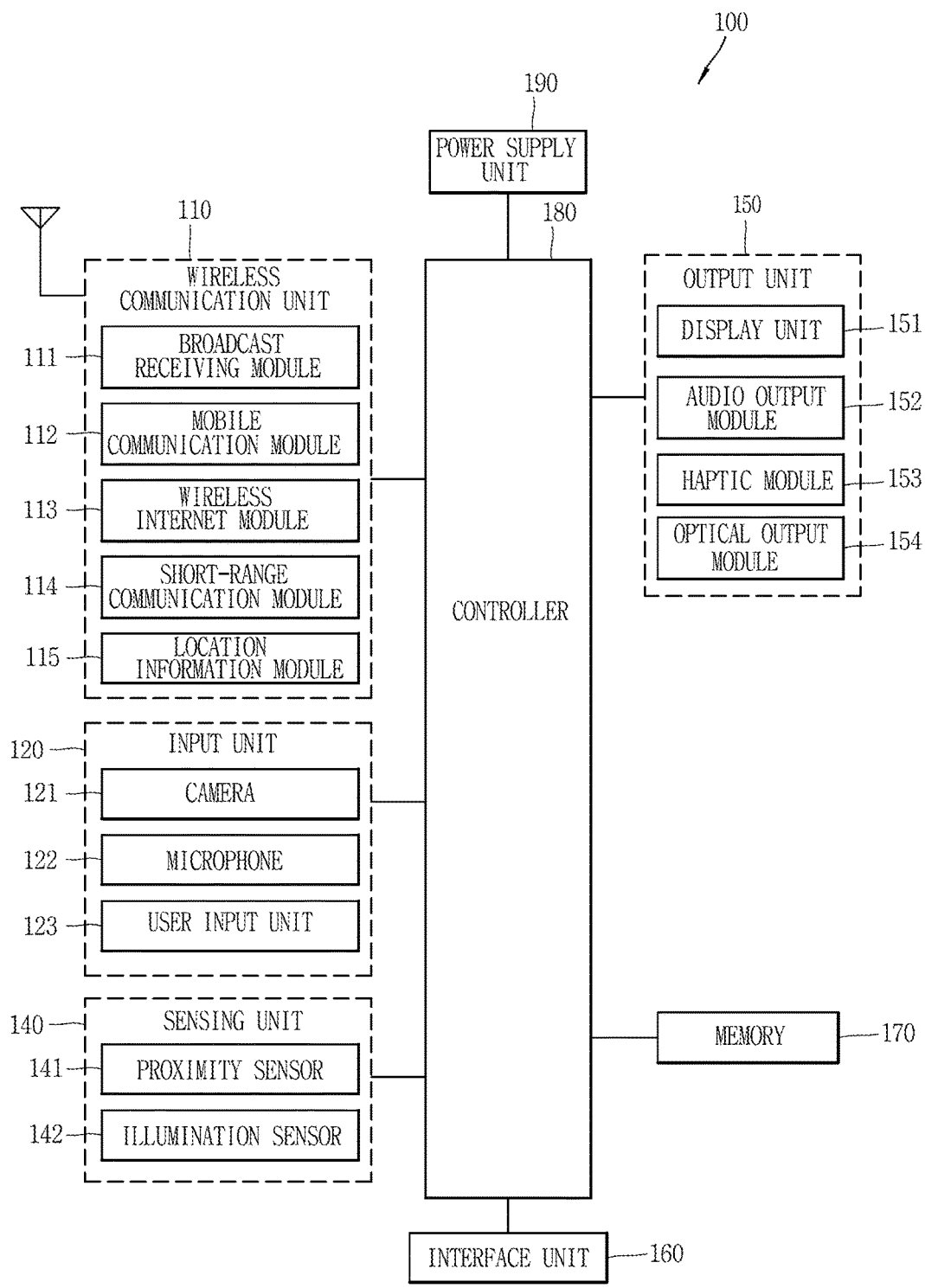

FIG. 21
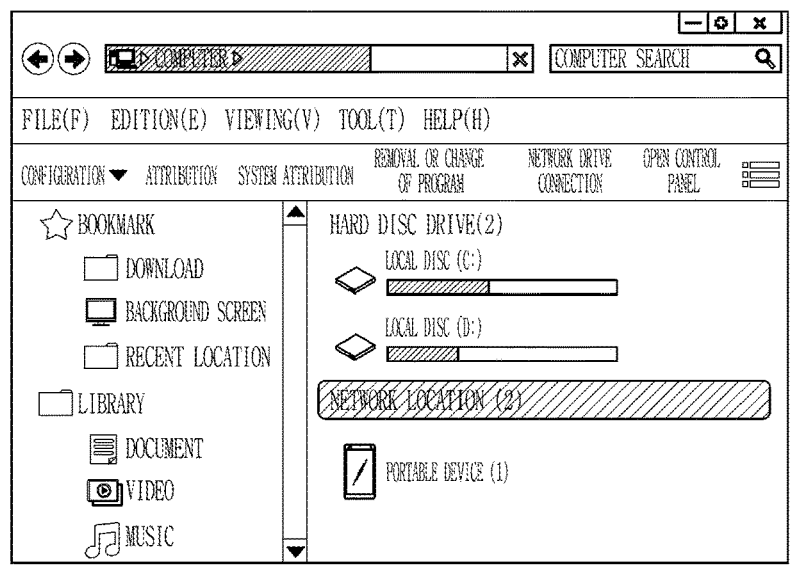
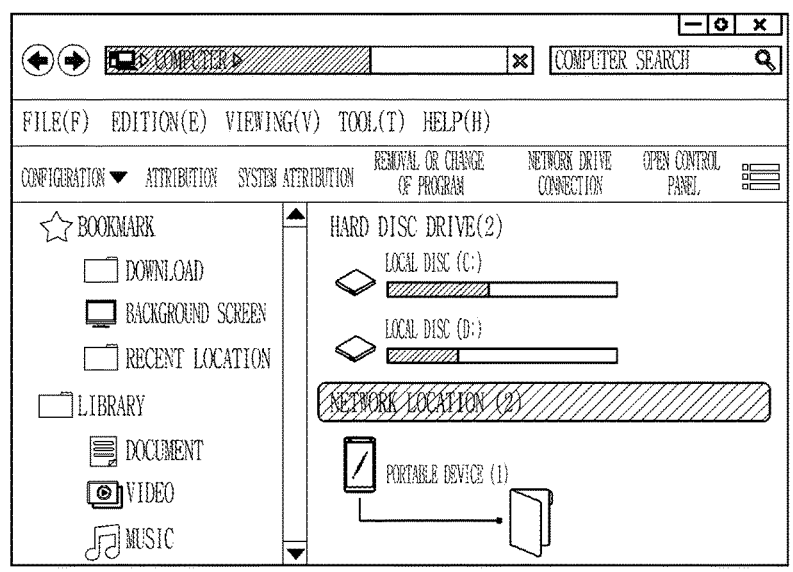

FIG. 22
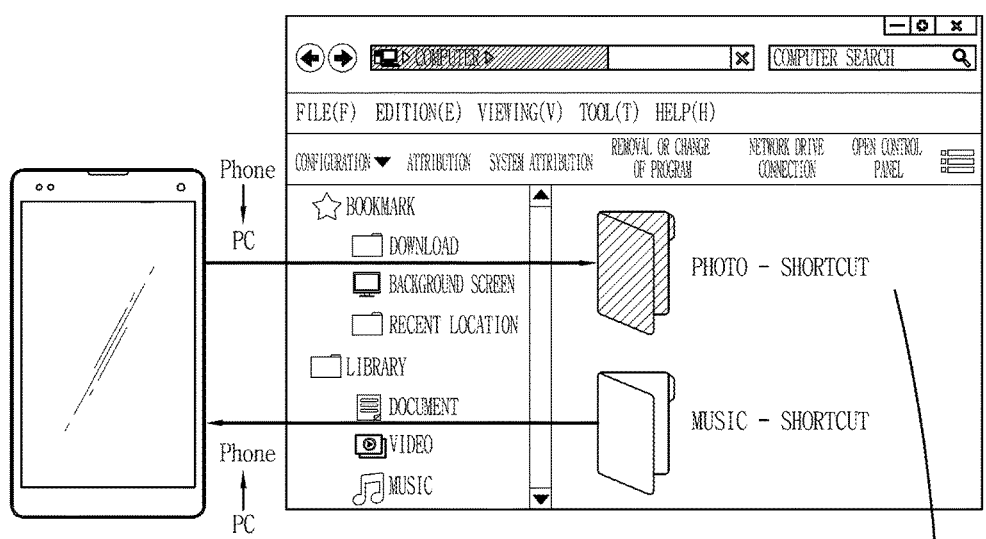
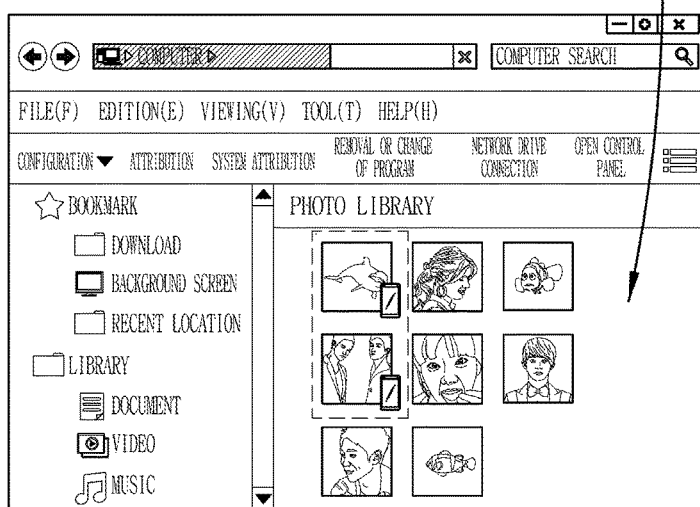

MOBILE TERMINAL AND DELETED INFORMATION MANAGING METHOD THEREOF

CROSS-REFERENCE TO RELATED APPLICATION

This application claims priority under 35 U.S.C. § 119 to Korean Application No. 10-2014-0114379 filed on Aug. 29, 2014, whose entire disclosure is hereby incorporated by reference.

BACKGROUND

1. Field

The present invention relates to a mobile terminal, and more particularly, to a mobile terminal capable of checking and restoring deleted data in a convenient manner, and a method for managing deleted information thereof.

2. Background

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Generally, since the mobile terminal has a small storage space, a user of the mobile terminal should frequently delete unnecessary information so as to obtain a sufficient storage space.

For instance, since various types of electronic documents are easily copied and transferred, the same documents may exist in the mobile terminal, and the user of the mobile terminal transfers files to an external device or other storage device due to a limited capacity of the mobile terminal. Especially, moving images, photos, and E-books inside the mobile terminal occupy a large capacity when they are not backed up, and cause a user's difficulty in remembering a back-up position when they are backed up. Thus, the user selectively deletes the same documents, or files, moving images, photos, and E-books transferred to an external device or other storage device.

However, the conventional mobile terminal has a disadvantage that deleted information cannot be restored, since it is completely deleted without leaving a history. Further, a user cannot check the deleted information (data).

BRIEF DESCRIPTION OF THE DRAWINGS

The embodiments will be described in detail with reference to the following drawings in which like reference numerals refer to like elements wherein:

FIG. 1 is a block diagram illustrating a mobile terminal according to the present invention;

FIGS. 21 and 22 are views illustrating an embodiment to indicate a back-up position when a mobile terminal is connected to a personal computer (PC);

DETAILED DESCRIPTION

Description will now be given in detail according to the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers and a digital signage.

Figure 2A:
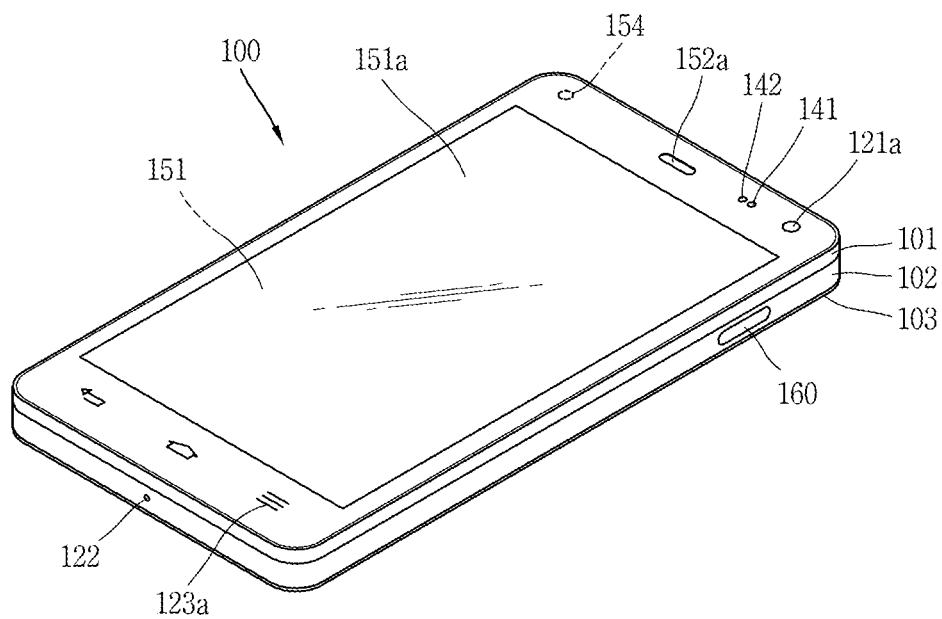
FIGS. 2A and 2B are conceptual views of a mobile terminal according to the present invention, which are viewed from different directions.
Figure 2B:
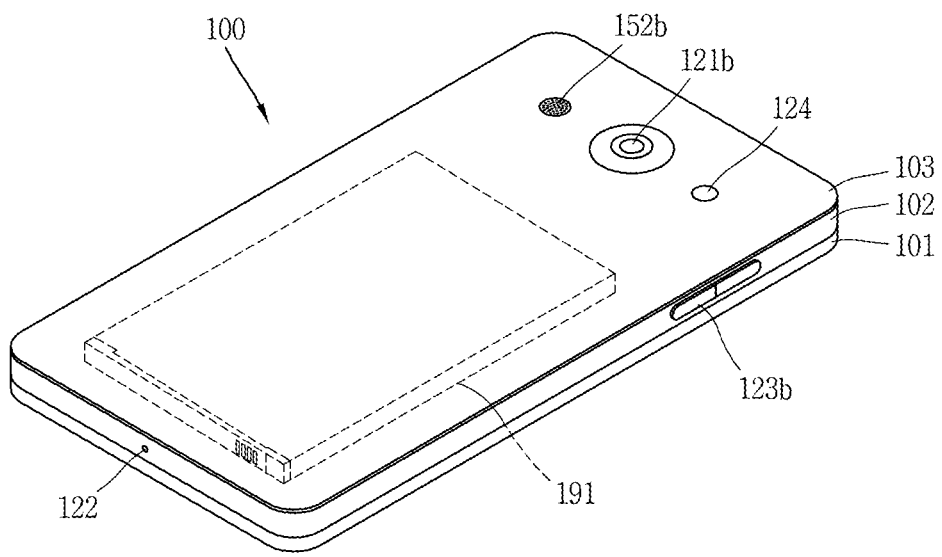

FIG. 1 is a block diagram illustrating a mobile terminal according to the present invention, and FIGS. 2A and 2B are conceptual views of a mobile terminal according to the present invention, which are viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions corresponding to a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations corresponding to the application programs. The controller 180 may provide or process information or functions appropriate for a user by processing signals, data, information and the like, which are input or output by the aforementioned various components, or activating application programs stored in the memory 170.

Further, the controller 180 may control at least one of the aforementioned components in FIG. 1, so as to drive application programs stored in the memory 170. Also, the controller 180 may operate at least two of the components of the mobile terminal 100 in a combined manner.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a mobile terminal according to various embodiments to be explained later. The operation or the control method of the mobile terminal may be implemented on the mobile terminal by driving at least one application program stored in the memory 170.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), Long Term Evolution (LTE), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation corresponding to an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing corresponding to voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 2A and 2B, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 2A and 2B depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIGS. 2A and 2B illustrate the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 2B, a flash 124 is shown adjacent to the second camera 121b. When an image of a subject is captured with the camera 121b, the flash 124 may illuminate the subject.

As shown in FIG. 2B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

A communication system which is operable with the described mobile terminal 100 will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system.

A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

Figure 3:
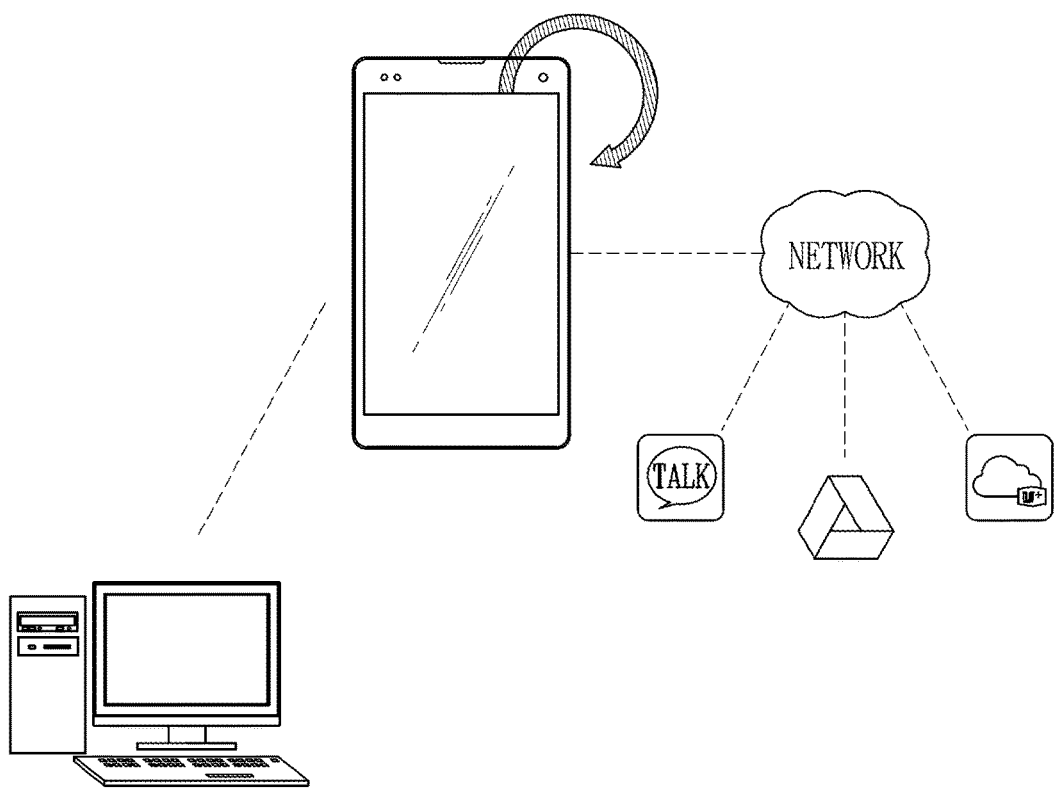
FIG. 3 is a view illustrating an external device and a network to which a mobile terminal is connected.

FIG. 3 is a view illustrating an external device and a network to which the mobile terminal is connected.

As shown in FIG. 3, the mobile terminal may receive (download) information from an external device (e.g., PC) or a network, and the received (downloaded) information may be moved or copied in the mobile terminal. The information of the mobile terminal may be backed-up to the external device (e.g., PC) or the network. When the information is transferred or moved, the information may be deleted.

Figure 4:
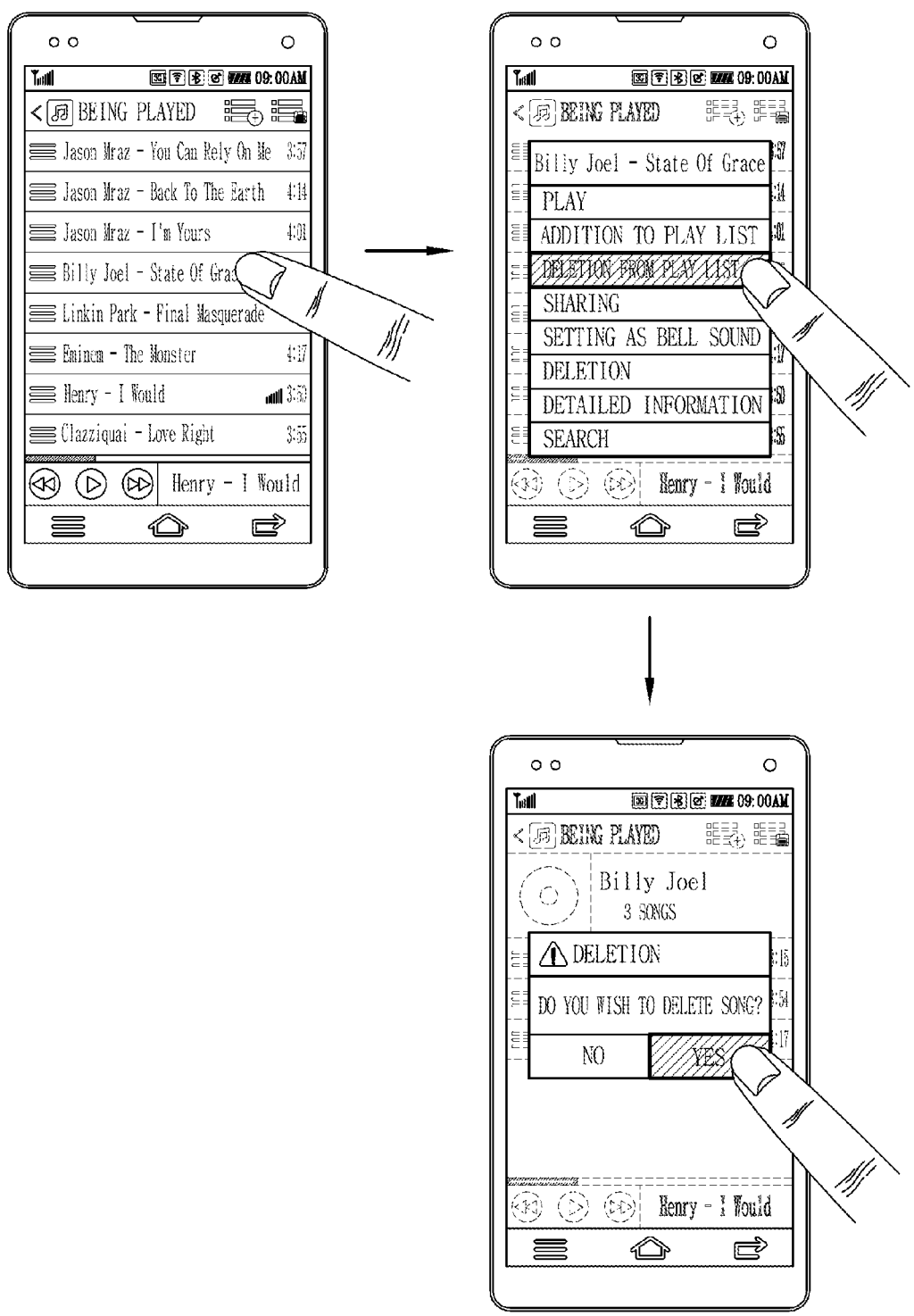
FIG. 4 is a view illustrating a general method for deleting data of a mobile terminal.

FIG. 4 is a view illustrating a general method for deleting data of the mobile terminal.

As shown in FIG. 4, if a user selects a single song from a play list and then selects a deletion menu, a deletion pop-up inquiring whether to delete the selected song is displayed on a screen.

If the user selects 'yes' (ok button) on the deletion pop-up, the controller deletes the song from the play list. In this case, since all information about the deleted song is deleted, the song cannot be restored.

Thus, the present invention provides various methods for allowing a user to check and restore deleted content later in an easy and convenient manner, by storing a deletion history when the content is deleted. The content may include texts, still images or moving images History Function and Setting/Storage of History Information FIG. 5 is a flowchart illustrating a method for setting a deletion history of the mobile terminal according to an embodiment of the present invention, and FIG. 6 is a view illustrating an example of a deletion pop-up for setting a deletion history function.

Figure 5:
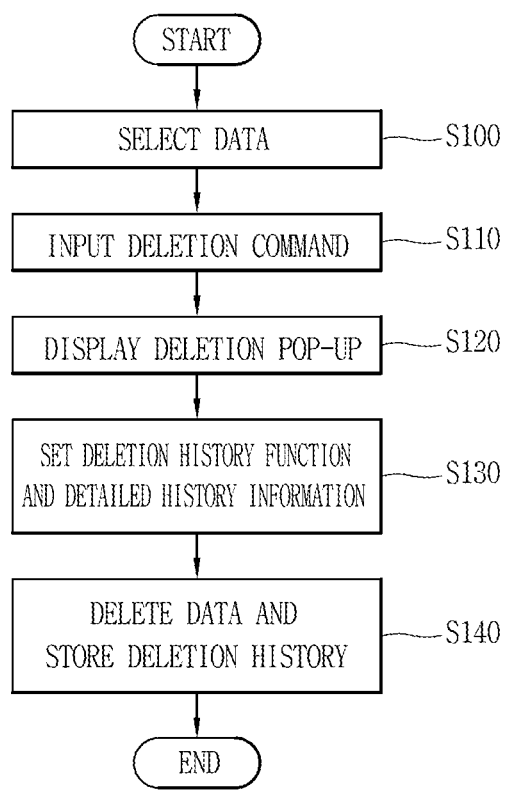
FIG. 5 is a flowchart illustrating a method for setting a deletion history of a mobile terminal according to an embodiment of the present invention.
Figure 6:
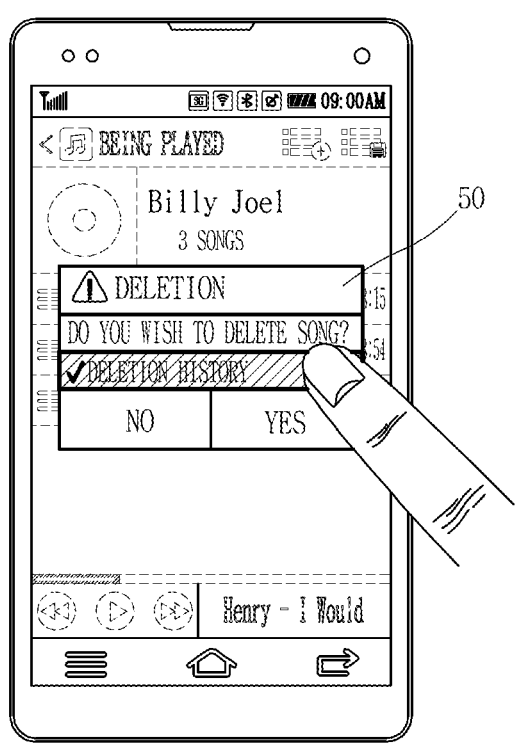
FIG. 6 is a view illustrating an example of a deletion pop-up for setting a deletion history function.

As shown in FIG. 5, a user selects data to be deleted from a data list (S100). Then, if a deletion command is input by the user (S110), the controller 180 displays a deletion pop-up 50 for setting a deletion history (a deletion record) as shown in FIG. 6 (S120).

The deletion pop-up 50 may include a check box (or on/off menu) for selecting a "deletion history" function. The user sets a "deletion history" function by checking the check box, and additionally sets history information (S130). The setting of history information indicates setting information to be left with consideration of a memory capacity, which means setting of a type of information to be left.

Figure 7:
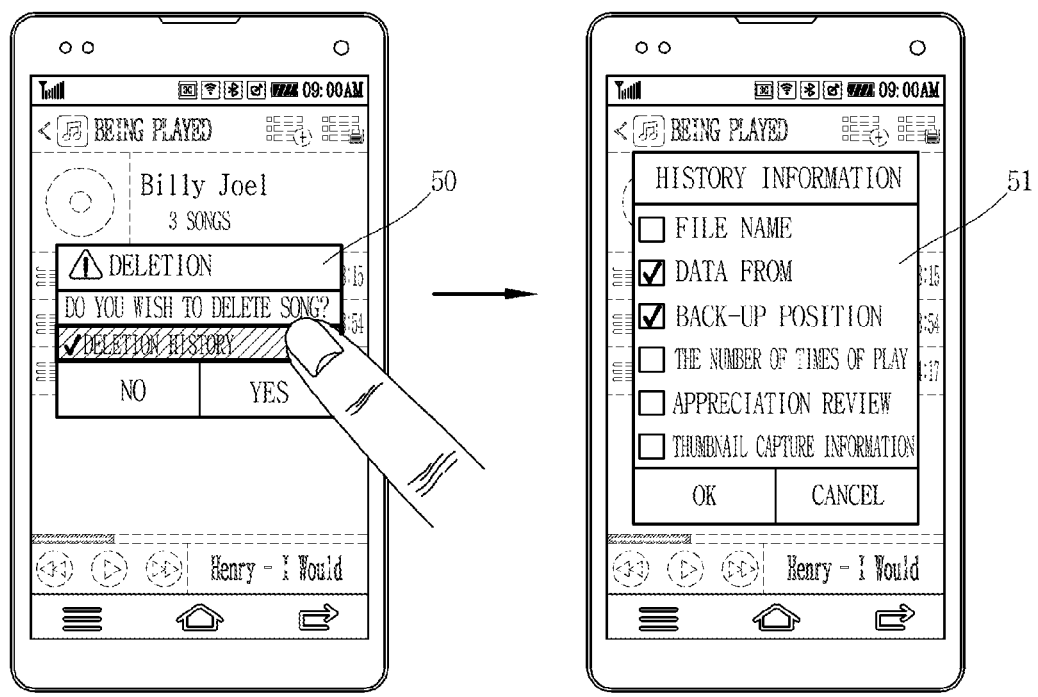
FIG. 7 is a view illustrating an embodiment to set history information.

FIG. 7 is a view illustrating an embodiment to set history information.

Referring to FIG. 7, if a deletion history menu is touched in a state where a deletion history function has been set, the controller 180 displays a pop-up 51 for setting history information. A user may select, from the pop-up 51, a type of information to be left when data is deleted, that is, history information.

The history information, information related to deleted data, may include information about data (a file name or a file size, data from, a back-up position, and a thumbnail image), and information generated from a user (an appreciation review and the number of times of play). The file name, the thumbnail, the capture information, and the back-up position, among the information, may be set as a default.

The number and a type of history information selectable from the pop-up 51 may be variable according to a type of deleted data.

In a case where the user has not set the deletion history function, the controller 180 may set the file name, the thumbnail, the capture information, and the back-up position of the history information, as a default.

Thus, in the present invention, a size of information to be left with consideration of a memory capacity of the mobile terminal can be optimized by setting history information when data is deleted.

Once the deletion history function and the history information are set, the controller 180 deletes data, and stores history information of the deleted data in the memory 170 (S130).

The stored history information includes a minimum (simple) image for a user's recognition of the deleted data. For instance, in a case where deleted data is a photo, a play list and an E-book, the minimum image may be a thumbnail image. On the contrary, in a case where deleted data is a text, the minimum image may be a title of the corresponding data.

The stored history information may include position information (a back-up position or an initial generation position) and user's input information (a play position, an appreciation review) for restoring deleted data. The history information may include a deleted time and a deleted order stored in an additional region of the memory 170.

On the other hand, if the deletion history function has not been set in S130, the controller 180 completely deletes data selected by the user in the same manner as the conventional art.

As another embodiment, when an automatic synchronization operation and a back-up operation are performed, a deletion history (record) may be stored in the mobile terminal automatically or according to a user's setting, after data is deleted.

Deletion History Display

Figure 8:
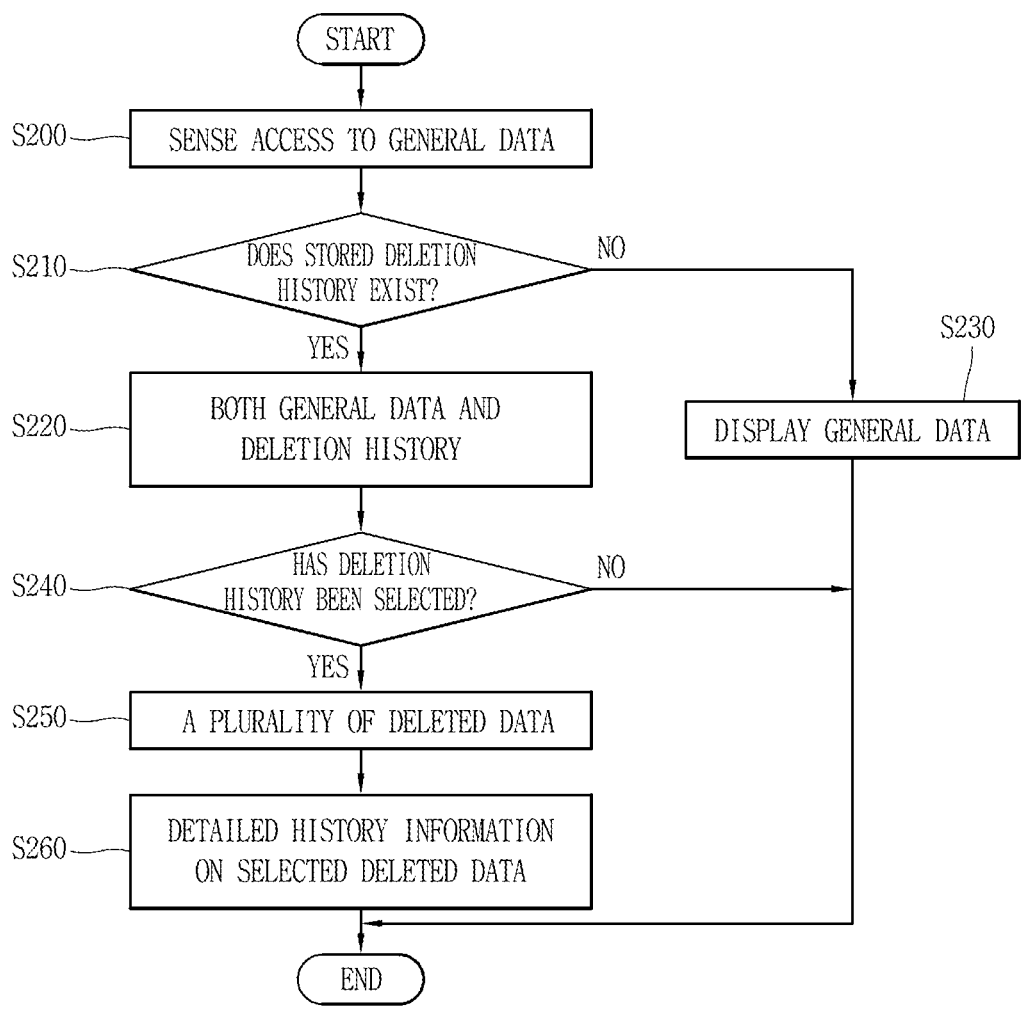
FIG. 8 is a flowchart illustrating an operation to check detailed information about a deletion history.

FIG. 8 is a flowchart illustrating an operation to check detailed information about a deletion history.

As shown in FIG. 8, upon sensing of access to general data (or a data list) stored in the memory 170 (S200), the controller 180 checks whether a deletion history has been pre-stored in the memory 170 (S210).

If there exists a deletion history in the memory 170 as a result of the check, the controller 180 displays both general data (information) and the checked deletion history (S220). On the other hand, if there does not exist a deletion history in the memory 170, the controller 180 displays only general data (S230).

The deletion history may be displayed on a final region of data being currently displayed on the screen. The deletion history may be configured so that a user can recognize a type of deleted data at a glance or through a detailed view. For instance, the deletion history may be displayed in the form of a list, or an image-type icon.

Then, if the user has selected the deletion history (icon) (S240), the controller 180 displays a plurality of deleted data (S250). If specific deleted data is selected among the plurality of deleted data, the controller 180 displays detailed history information of the specific deleted data on the screen (S260).

On the other hand, if the user has not selected the deletion history (icon) in S240, the controller 180 may periodically sense whether the deletion history has been selected or not, while executing an operation related to general data.

Figure 9A:
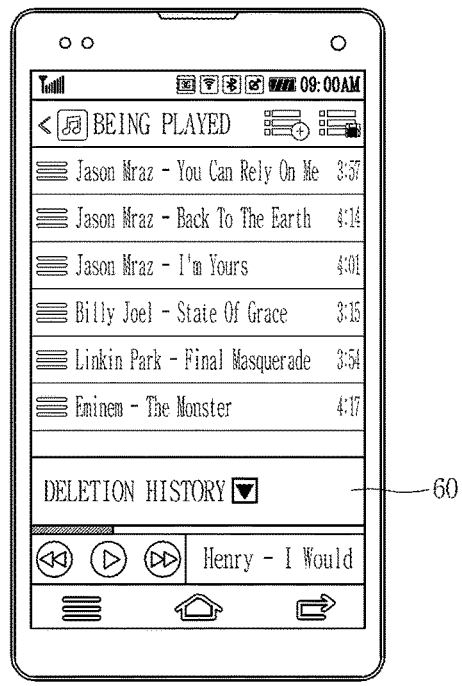
FIGS. 9A to 9C are views illustrating an embodiment to show a display type of a deletion history.
Figure 9B:
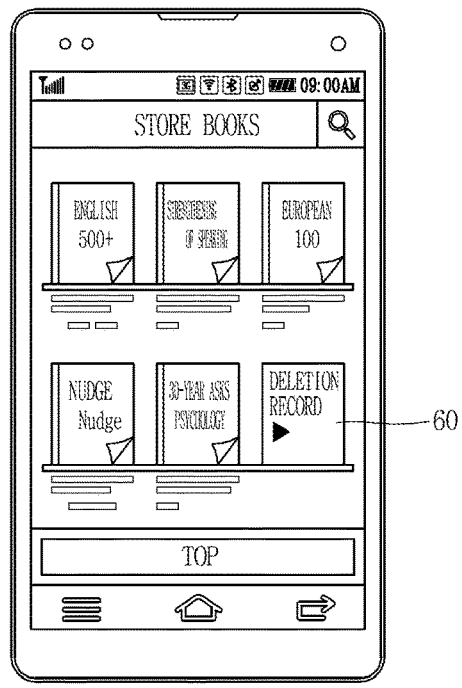
Figure 9C:

FIGS. 9A to 9C are views illustrating an embodiment to show a display form of a deletion history.

FIGS. 9A and 9B illustrate an example of a deletion history 60 displayed in the form of a list, and FIG. 9C illustrates an example of the deletion history 60 displayed in the form of an image (thumbnail). Referring to FIGS. 9A to 9C, the deletion history 60 is displayed on a final region of a play list or an E-book.

A user may easily recognize that a type of deleted data is a photo, based on the deletion history 60 of thumbnail images shown in FIG. 9C. The method for displaying the deletion history using the thumbnail images may be also applicable to an album photo, a music & video play list, an E-book, an installation app, etc.

Display of Detailed History Information

Figure 10:
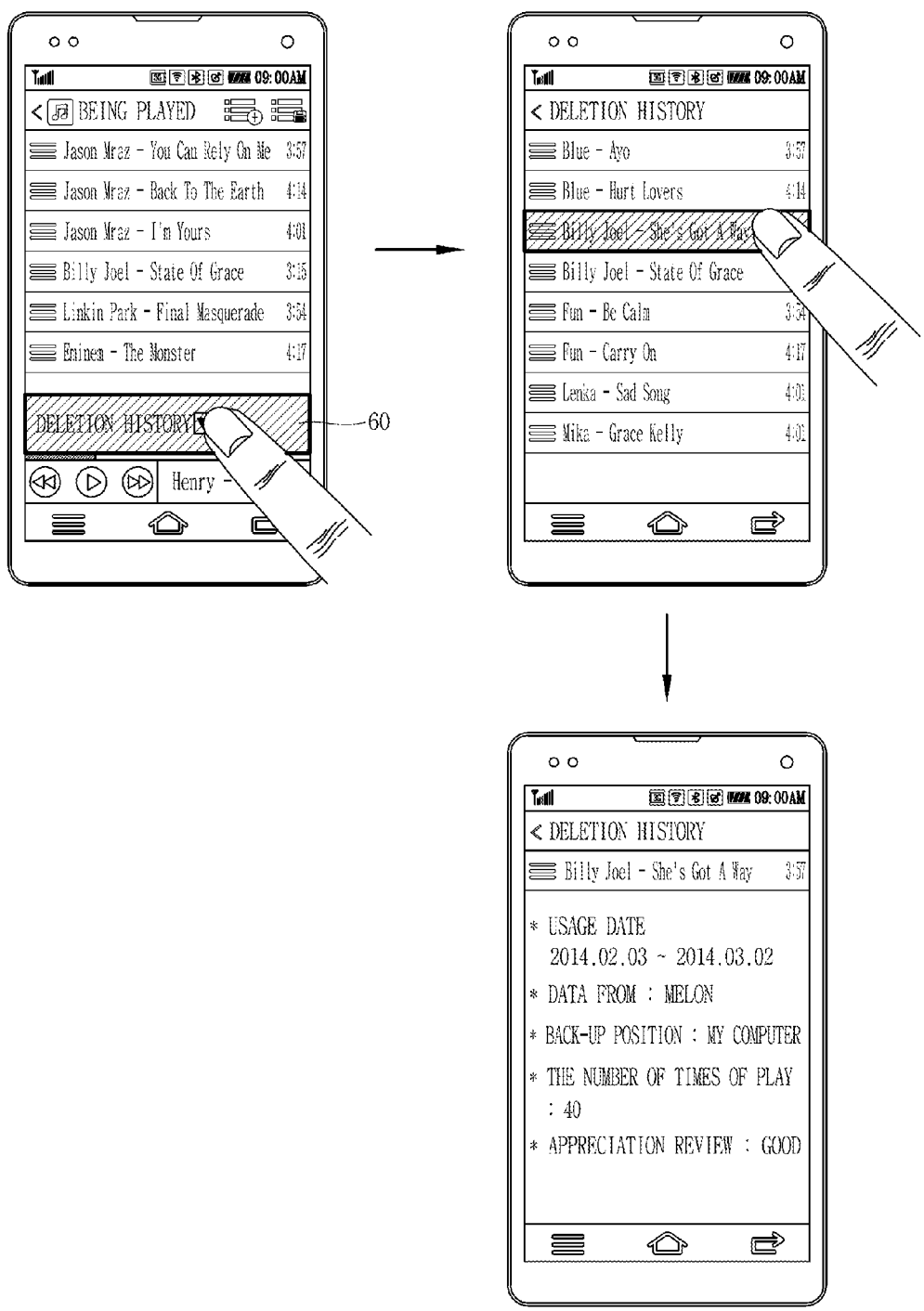
FIGS. 10 and 11 are views illustrating an embodiment to display detailed history information.
Figure 11:
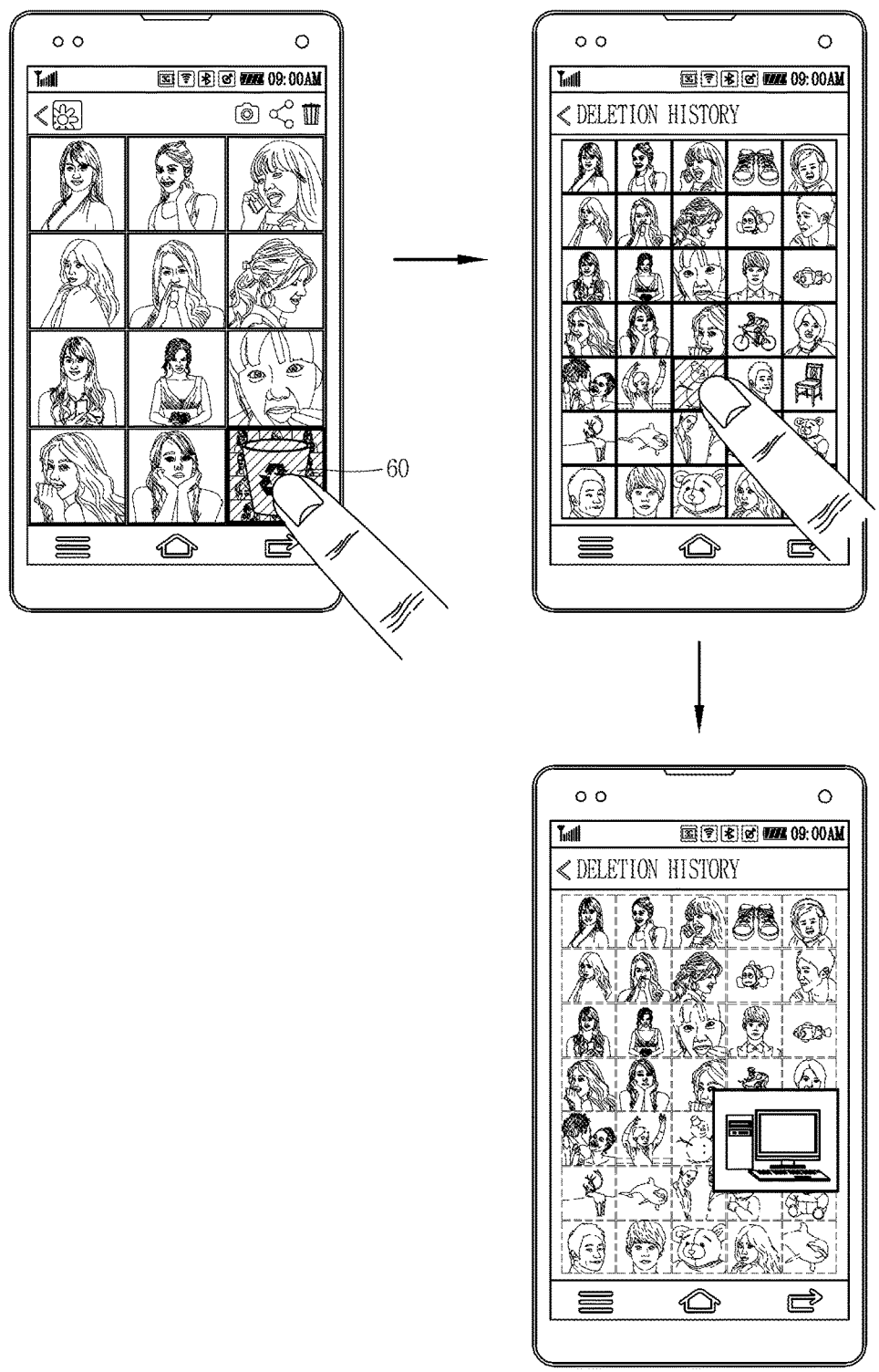

FIGS. 10 and 11 are views illustrating an embodiment to display detailed history information.

As shown in FIG. 10, once the deletion history 60 in the form of a list is selected, the controller 180 displays a plurality of deleted data in a time order, on the deletion history 60. The deletion history, part shown to a minimum number of users, is implemented as minimum data. For instance, when the deletion history is implemented in the form of a list, a name (or a title) of deleted data is displayed. On the contrary, when the deletion history is implemented in the form of an image, a thumbnail image of deleted data is displayed.

Once specific deleted data is selected from the deletion history, the controller 180 may display detailed history information, i.e., a usage date, a data from (an initial data generation position), a back-up position, a play frequency (the number of times of play), and an appreciation review.

As another embodiment, as shown in FIG. 11, once the deletion history 60 implemented in the form of an image is selected, the controller 180 displays a plurality of deleted thumbnail images (e.g., photos or capturing screens), on the deletion history 60.

If a specific deleted thumbnail image is selected from the plurality of deleted thumbnail images, the controller 180 displays an image guiding a method for restoring the specific deleted thumbnail image. The specific deleted thumbnail image may be restored from its back-up position (e.g., a PC), or its initial generation position (or obtained position).

With such a configuration, a user may restore the deleted data by selecting a back-up position displayed in the form of a text, or guided in the form of an image as shown in FIGS. 10 and 11.

In the present invention, when an image-type deletion history icon is selected, an image indicating a back-up position is displayed. However, the present invention is not limited to this. That is, other history information set by a user may be displayed. For this, in the present invention, an option for selecting a type of history information may be provided on one side of a deletion history screen.

Figure 12:
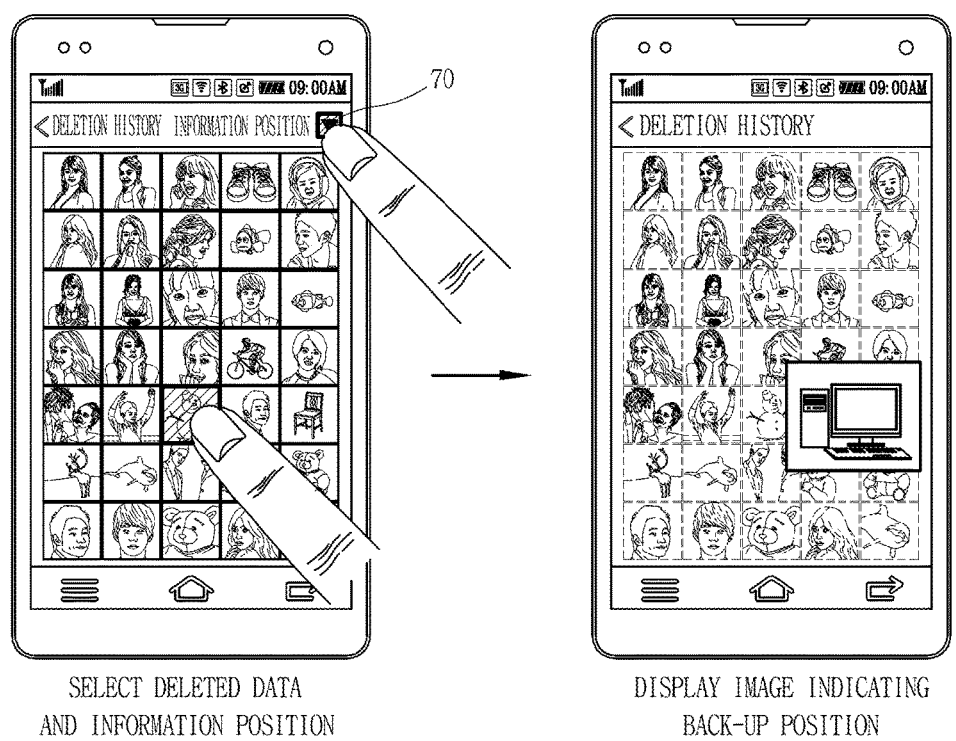
FIGS. 12 and 13 are views illustrating an embodiment to display various history information according to a user's selection.
Figure 13:
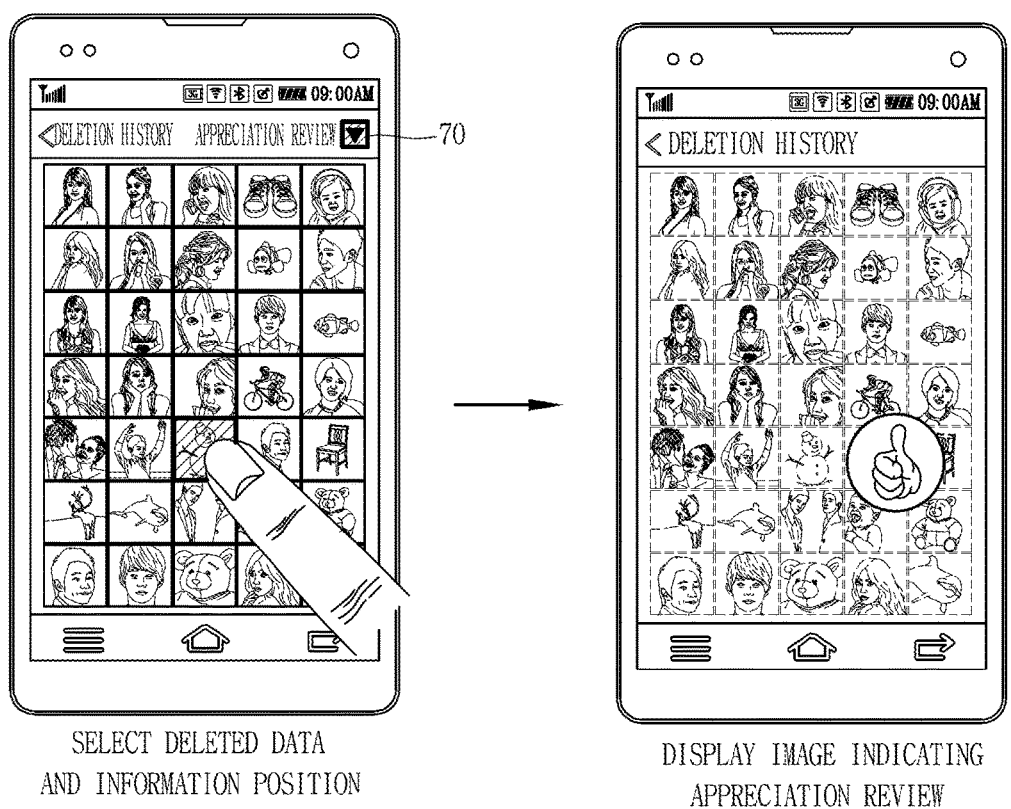

FIGS. 12 and 13 are views illustrating an embodiment to display various history information according to a user's selection.

An option 70 for selecting a type of detailed history information may be displayed on a right upper end region of the deletion history screen. A user may select his or her desired type of detailed deletion history information, by selecting the option 70. The option 70 may display all types of history information when touched once, or may display different history information whenever touched.

If a user has set a desired type of history information using the option 70 and then selects a specific deleted image, the controller 180 may display information related to the selected type. For instance, as shown in FIG. 12, if an "information position" indicating a position of deleted data is selected, the controller 180 displays an image indicating a back-up position (e.g., a PC) of the deleted data.

As another example, as shown in FIG. 13, if "an appreciation review" is selected, the controller 180 displays an appreciation review with respect to the deleted data, in the form of an image.

Restoration of Deleted Data

Figure 14:
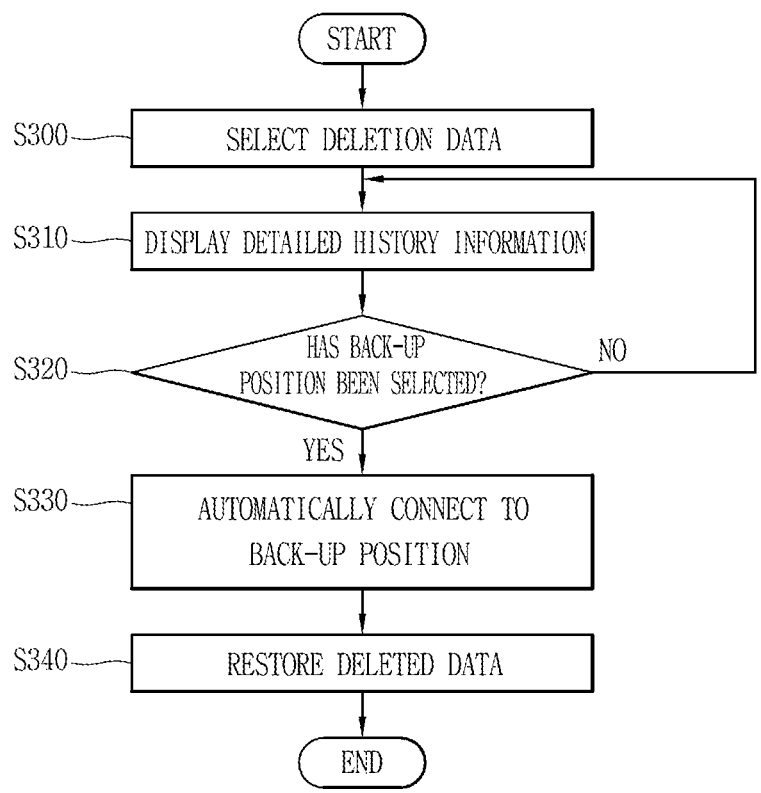
FIG. 14 is a flowchart illustrating a method for restoring deleted data using a deletion history.

FIG. 14 is a flowchart illustrating a method for restoring deleted data using a deletion history.

As shown in FIG. 14, once a user selects single deleted data among a plurality of deleted data, the controller 180 displays detailed history information of the deleted data (S300, S310) (refer to FIGS. 10 and 11). The detailed history information may include data information (a file name or a file size, a data from, a back-up position and a thumbnail image), and information generated by a user (an appreciation review and the number of times of play).

If a user has selected a back-up position among the detailed history information (S320), the controller 180 is automatically connected to the back-up position (S330). Then, the controller 180 downloads data according to a user's input, and restores the deleted data (S330, S340).

On the other hand, if a user has not selected a back-up position, the controller 180 controls the mobile terminal to return to the step (S310).

Figure 15:
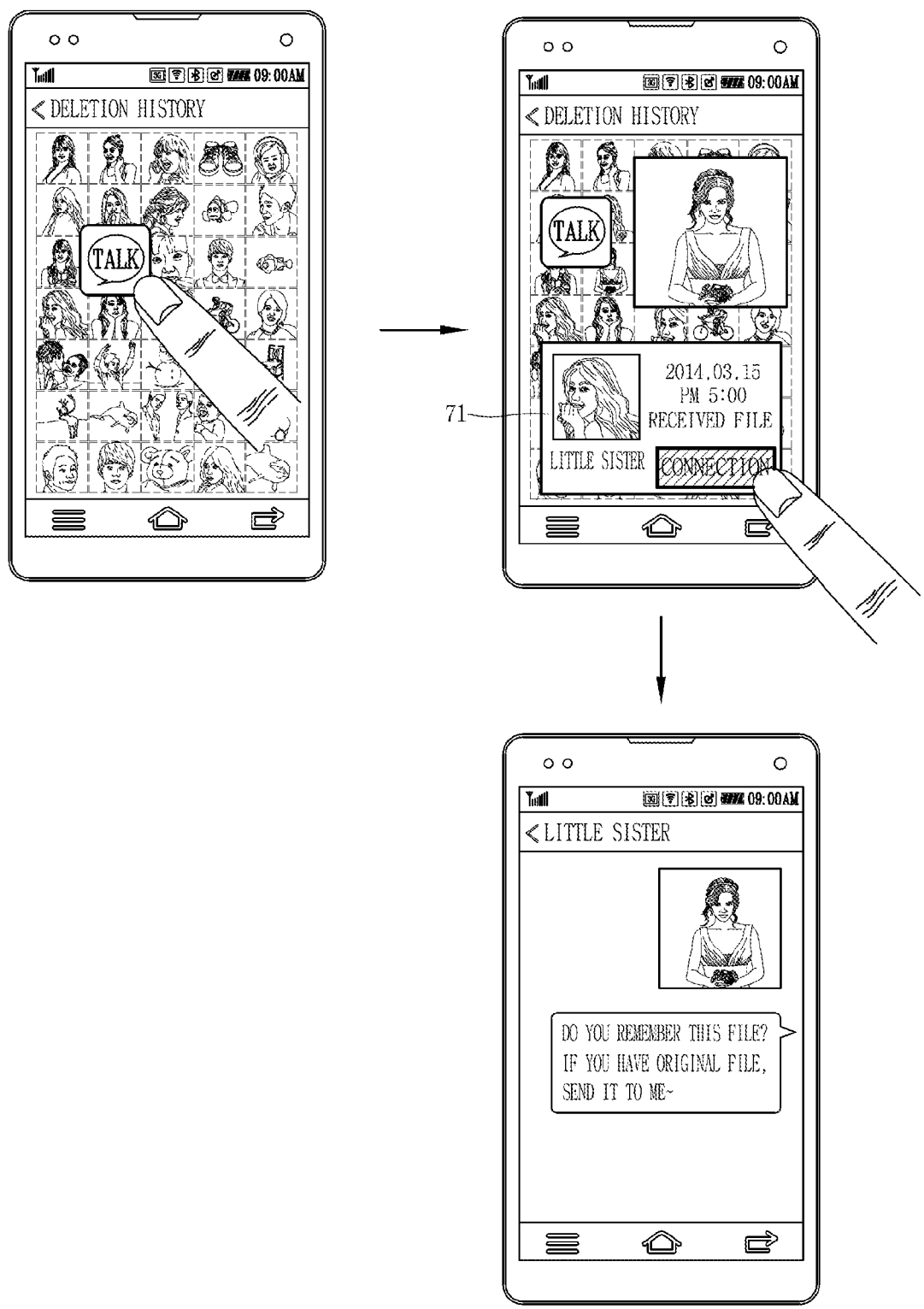
FIGS. 15 and 16 are views illustrating an embodiment to restore deleted data by using a deletion history.
Figure 16:
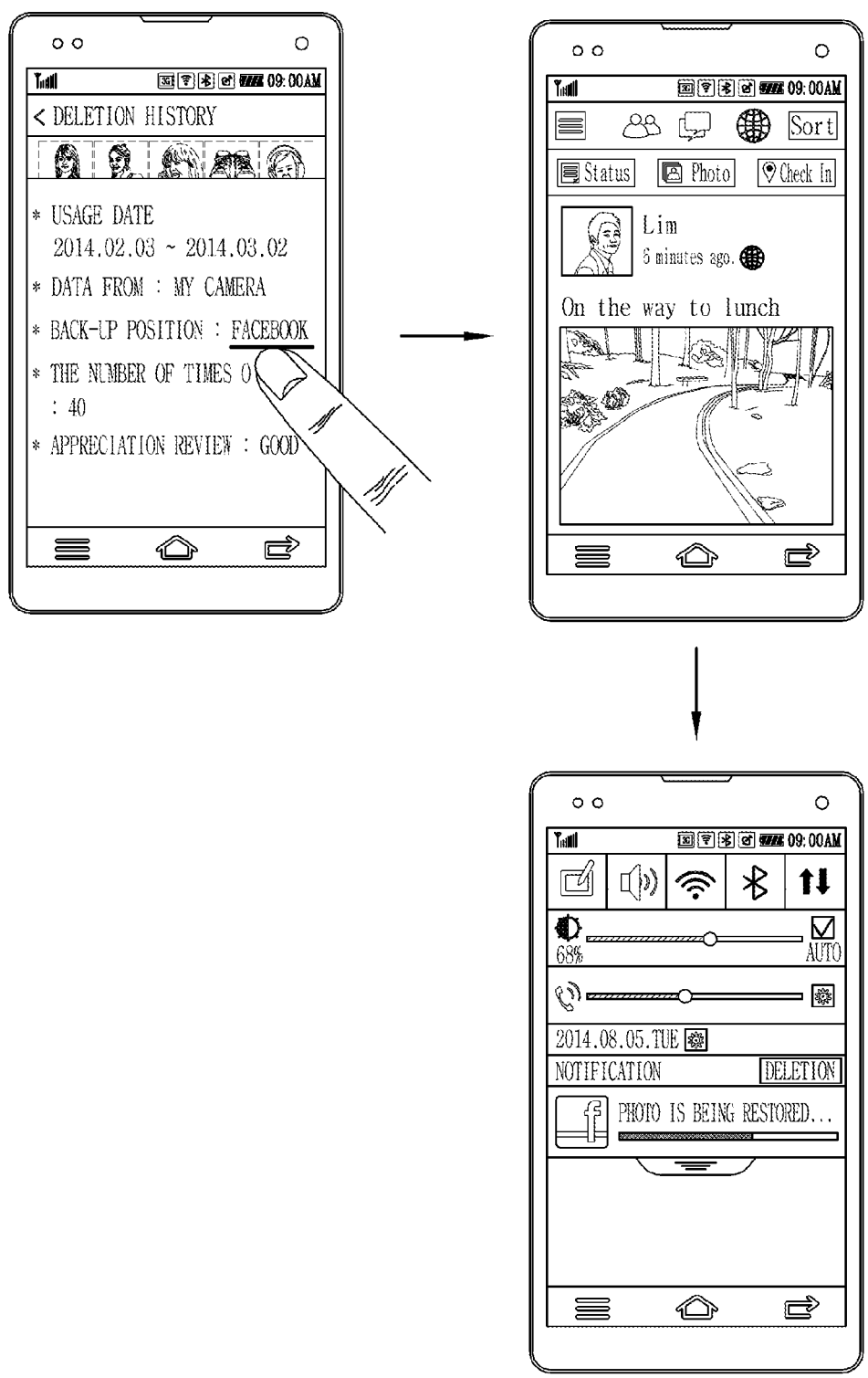

FIGS. 15 and 16 are views illustrating an embodiment to restore deleted data by using a deletion history.

Once specific deleted data is selected from a plurality of deleted data included in a deletion history, the controller 180 displays detailed history information including a back-up position.

As shown in FIG. 15, if a user selects image information indicating a back-up position, the controller 180 displays detailed information 71 about a back-up position of data. The image information may be an image indicating an instant messenger (IM) of a network (e.g., TALK), and the detailed information 71 includes a data reception date, a person who has transmitted data (e.g., little sister), and a connection method.

Once the user requests for connection after viewing the detailed information 71 about a back-up position of data, the controller 180 automatically accesses the little sister's messenger, and requests the little sister to transmit deleted data for restoration. Thus, the user may restore the deleted data.

As another embodiment, as shown in FIG. 16, if a back-up position of a photo (i.e., Facebook) is selected from a list-type deletion history (refer to FIG. 10), the controller 180 automatically accesses a URL of the Facebook, and displays a photo uploaded to the Facebook. A user may download the photo from the Facebook for restoration.

The aforementioned method is applied when the number of deleted data is small. However, in case of a video, a large number of data is frequently deleted. In a case where the number of deleted files exceeds a predetermined value, if a deletion history (record) is displayed in the form of a list or an image, the user may have a difficulty in recognizing the deletion history.

In order to solve such a problem, in the present invention, if the number of deleted files exceeds a predetermined value, deleted content may be displayed in the form of icons, after being sorted according to a back-up position. The user may restore deleted content by accessing a predetermined back-up position, by selecting the icon.

Display and Restoration of Deleted Data According to a Back-Up Position (Place)

Figure 17:
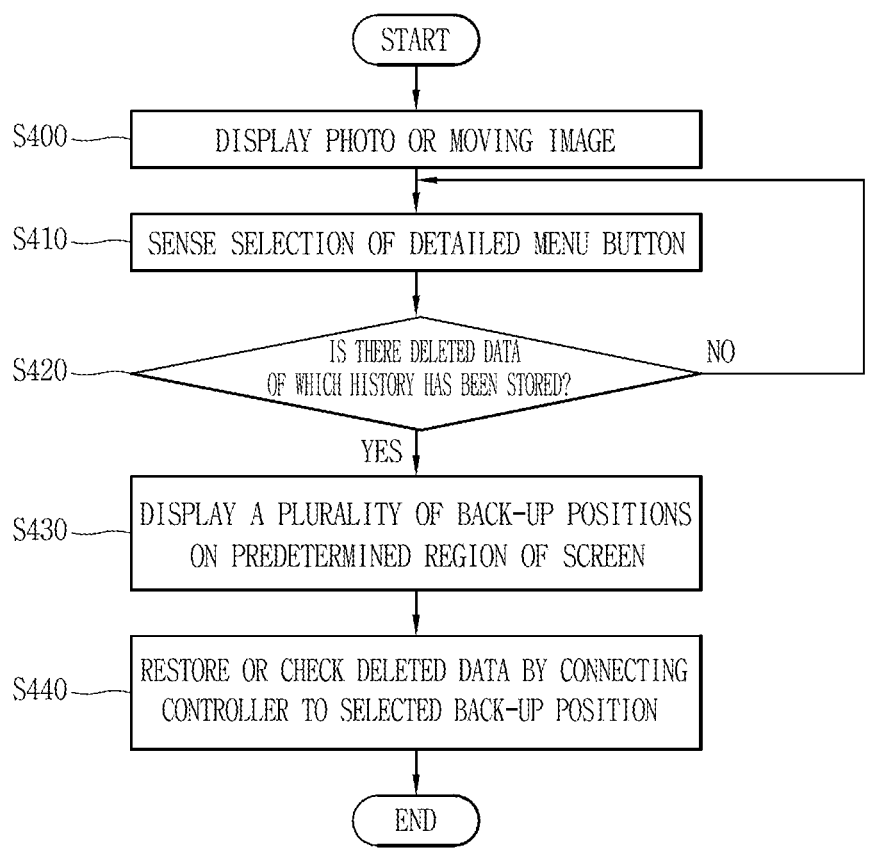
FIG. 17 is a flowchart illustrating a method for restoring deleted data according to a back-up position.

FIG. 17 is a flowchart illustrating a method for restoring deleted data according to a back-up position.

As shown in FIG. 17, once a user displays a gallery, a plurality of videos or photos which have not been deleted are displayed on a screen (S400). If the user selects a detailed menu button on the screen, the controller 180 checks whether deleted data of which history has been stored exists in the memory 170 (S410, S420).

If deleted data of which history has been stored exists in the memory 170, the controller 180 displays, on a lower end of the screen, icons indicating different types of back-up positions of deleted data, and an icon indicating data which has left a history without being backed-up (S430).

If a user has selected an icon indicating a specific back-up position, the controller 180 may be automatically connected to the specific back-up position such that the user restores or checked deleted data (S440).

Figure 18:
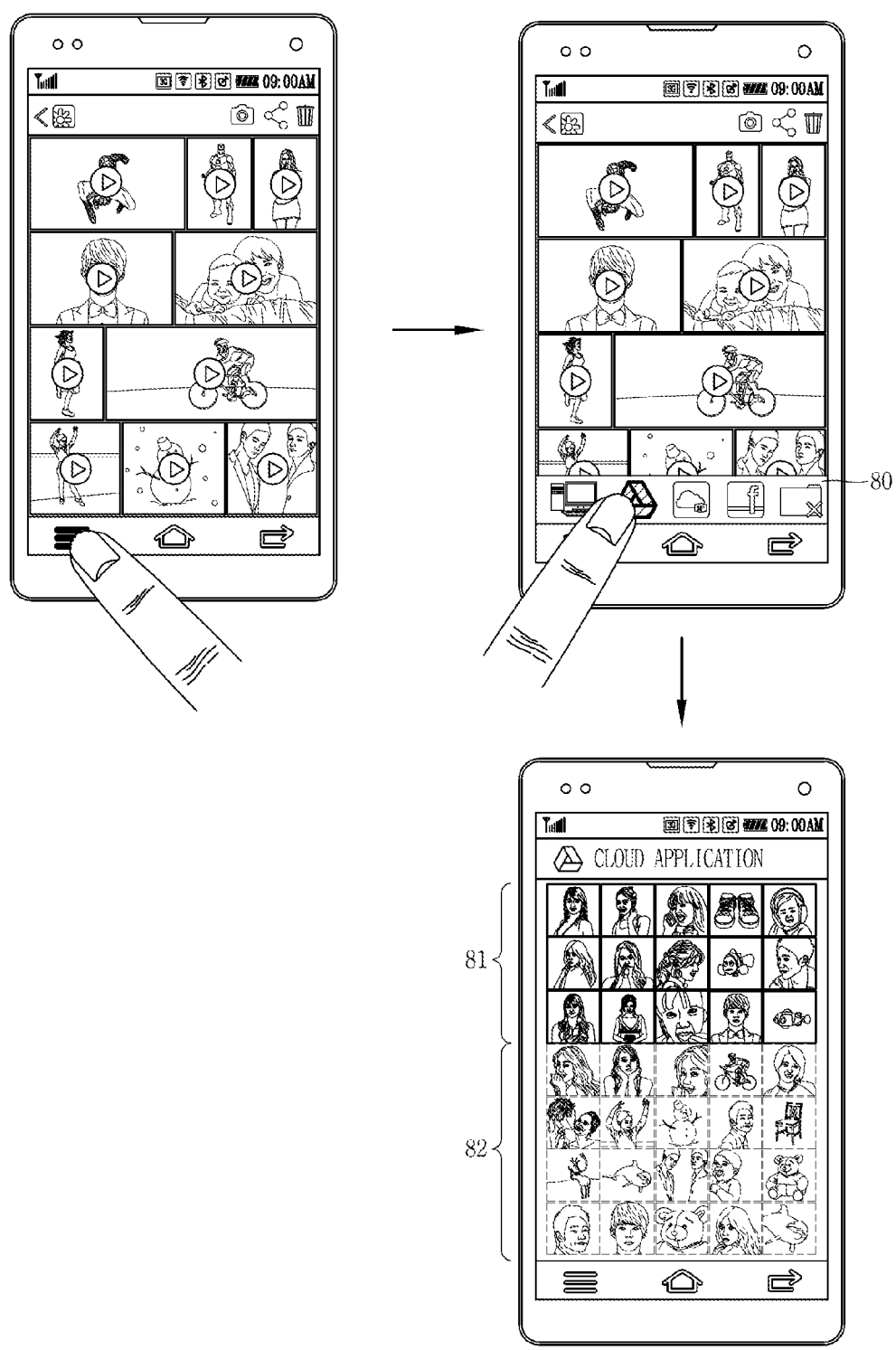
FIGS. 18 and 19 are views illustrating an embodiment to restore deleted data according to a back-up position.
Figure 19:
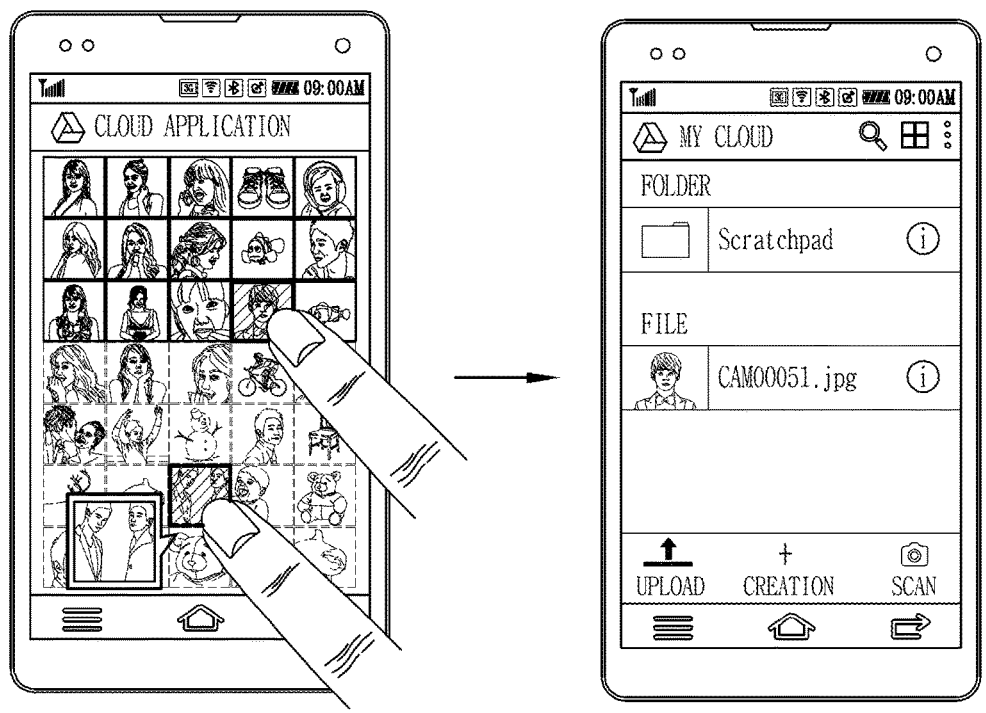

FIGS. 18 and 19 are views illustrating an embodiment to restore deleted data according to a back-up position.

Once a user selects a detailed menu button, the controller 180 displays, on a lower region 80 of the screen, at least one icon indicating a back-up position of deleted data, and an icon indicating deleted data which has left history information without being backed-up.

If the user selects an icon indicating a specific back-up position, e.g., an icon corresponding to a cloud application (or back-up application) from the lower region 80, the controller 180 immediately interworks with the application, and displays a plurality of photos which have been previously uploaded to the application by the user.

The plurality of photos are displayed such that photos 81 remaining on the cloud application and photos 82 deleted from the cloud application are distinguished from each other. Especially, the photos 82 deleted from the cloud application may be displayed in gray.

As shown in FIG. 19, if the user selects one of the photos 81 remaining on the cloud application, the controller 180 may search a cloud position where the corresponding photo exists, and displays the searched cloud position such that the user downloads the corresponding photo for restoration.

On the other hand, as shown in FIG. 19, if the user selects one of the photos 82 deleted from the cloud application by a long touch input, the controller 180 provides minimum information of the corresponding photo, since a link of the corresponding photo does not exist. For instance, the controller 180 displays the corresponding photo in an enlarged manner.

Figure 20:
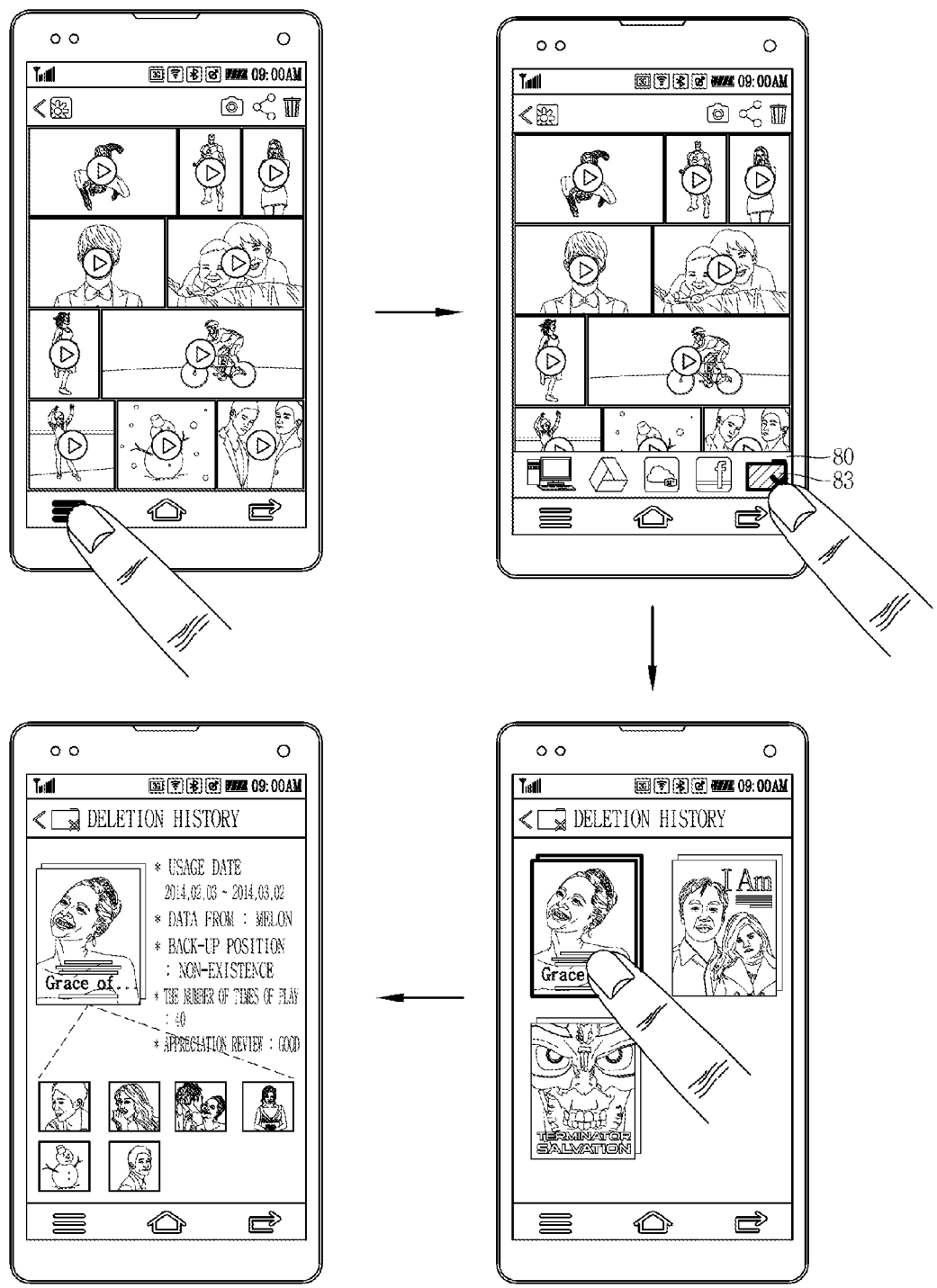
FIG. 20 is a view illustrating an embodiment to check deleted data which has left a history without being backed-up.

FIG. 20 is a view illustrating an embodiment to check deleted data which has left only a history without being backed-up.

As aforementioned, once a detailed menu button is selected in a state where a plurality of videos have been displayed, the controller 180 displays, on the lower region 80 of the screen, a plurality of icons indicating back-up positions of deleted data, and an icon 83 indicating data which has left a deletion history without being backed-up.

If the icon 83 is selected, the controller 180 displays a plurality of thumbnail images automatically extracted from videos before data deletion, or a plurality of video capture images selected by a user. If one of the displayed images is selected, the controller 180 displays detailed information about the selected image except for a back-up position. The remaining images except for the selected image may be displayed on a region rather than the display region of the selected image, in an unfolded manner.

FIGS. 21 and 22 are views illustrating an embodiment to indicate a back-up position when a mobile terminal is connected to a personal computer (PC).

Generally, when a mobile terminal and a PC are connected to each other, the PC displays the mobile terminal by recognizing the mobile terminal as a storage device, as shown in FIG. 21. In a case where data transfer has occurred, the PC displays only folders of data which has been transferred.

Thus, the controller 180 of the mobile terminal may check a position (PC→Phone) where an original file of deleted data exists.

As another embodiment, folders displayed on the PC may be displayed differently according to a data transmission method, such that it is determined whether data transfer has been executed from a PC to the mobile terminal (PC-→Phone) or from the mobile terminal to the PC (Phone→PC).

For this, in the present invention, a color of a folder may be differently displayed according to whether data has been transferred from the mobile terminal to the PC, or from the PC to the mobile terminal. For instance, as shown in FIG. 22, the original file of data (PC→Phone) may be displayed as a blue folder, and backed-up data may be displayed as a yellow folder. If the blue folder is selected, the controller 180 of the mobile terminal displays a plurality of backed-up photos.

In case of capturing a bust shot (continuous shot) or a panorama shot using a camera, a user deletes photos rather than a best shot, since there are many photos similar to each other. In this case, the deleted photos cannot be restored, since they are not backed-up.

In the present invention, when a plurality of images are deleted without being backed-up, a deletion history is stored such that a user recognizes a backed-up position of the deleted images. In an embodiment, a deleted image may be linked to a representative image, and the deleted image may be displayed on one side of the screen when the representative image is displayed.

Figure 23:
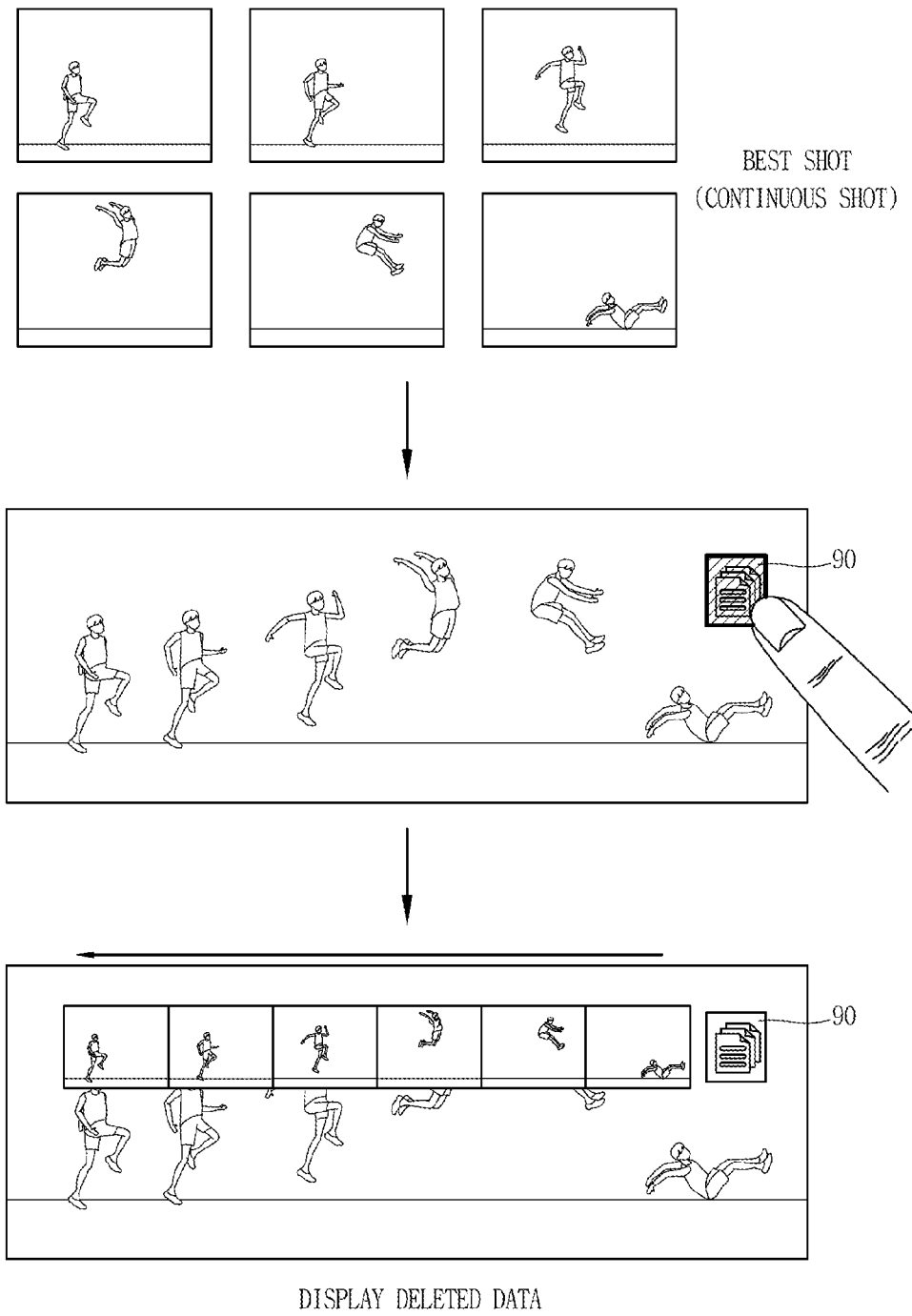
FIG. 23 is a view illustrating an embodiment to show a display method of similar images deleted without a back-up.

FIG. 23 is a view illustrating an embodiment to show a display method of similar images deleted without being backed-up.

A user captures a bust shot (continuous shot) using a camera, and deletes the remaining photos except for a representative image (e.g., best shot) after setting a history. The deleted photos are photos which have been captured in an erroneous manner.

The deleted photos mean photos deleted without an additional back-up, since they are not used later. The controller 180 stores the deleted photos by linking them to the representative image.

The stored deleted photos are displayed on one side of the screen when the representative image is displayed, in the form of an icon 90. If the icon 90 is selected, the stored deleted photos are displayed by being unfolded in a horizontal or vertical direction.

Figure 24:
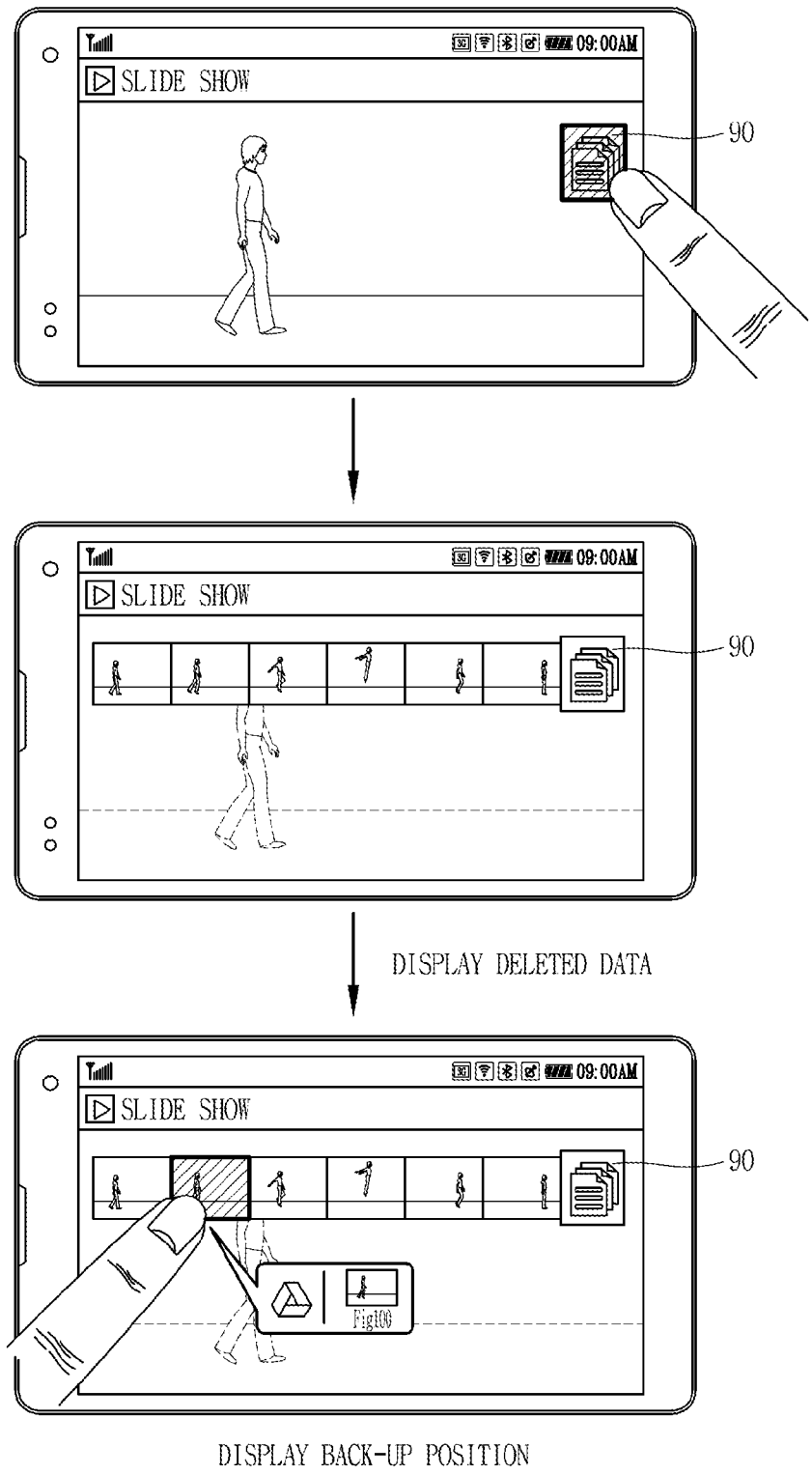
FIG. 24 is a view illustrating an embodiment to show a display method of similar images deleted after being backed-up.

FIG. 24 is a view illustrating an embodiment to show a display method of similar images deleted after being backed-up.

In a case where there are similar images among a plurality of captured images, the remaining images except for a representative image may be backed-up. The remaining images mean images deleted after being backed-up, with consideration of a capacity of the mobile terminal, and may be used later.

The controller 180 stores a deletion history of deleted images, and links the deleted images to the representative image. As an example, in case of an album cover, the remaining photos except for only a representative photo indicating "A trip to Jeju island" are backed-up to an external device (PC) or a network.

Thus, the deleted images are displayed on one side of the screen in the form of the icon 90 when the representative image is displayed. If the icon 90 is selected, the deleted images are displayed by being unfolded in a horizontal or vertical direction. If one of the displayed images is selected, the controller 180 displays a back-up position of the selected image (e.g., a google driver or an SNS). A user may select the back-up position, and may download the deleted image from the back-up position for restoration.

The present invention can have the following advantages.

Firstly, when content is deleted, at least one deletion history is stored. When other content which has not been deleted is displayed, the stored deletion history is visually displayed such that a user easily recognizes deleted content.

Secondly, when the displayed deletion history is selected, information about a back-up position of the deleted content is provided. This can allow a user to restore the deleted content more rapidly and conveniently.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

Therefore, an aspect of the detailed description is to provide a mobile terminal capable of allowing a user to check deleted data by managing a history of the deleted data, and a method for managing deleted information thereof.

Another aspect of the detailed description is to provide a mobile terminal capable of restoring deleted data by managing a history of the deleted data, and a method for managing deleted information thereof.

To achieve these and other advantages and in accordance with the purpose of this specification, as embodied and broadly described herein, there is provided a method for managing deleted information of a mobile terminal, including: sensing a deletion command with respect to content; inputting a setting of a deletion history; deleting corresponding content according to the input setting of the deletion history, and storing the deletion history; and displaying the stored deletion history together with other content which has not been deleted.

To achieve these and other advantages and in accordance with the purpose of this specification, as embodied and broadly described herein, there is also provided a mobile terminal, including: a display unit configured to display content; a memory configured to store therein content; and a controller configured to delete content and to store a deletion history of the content in the memory when a deletion command is input, and configured to display the stored deletion history on the display unit, together with other content which has not been deleted.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for managing information at a mobile terminal, the method comprising:
   deleting, from the mobile terminal, at least one stored content according to a received deletion command;
   storing a deletion history of the deleted at least one stored content, the deletion history includes information for restoring deleted content;
   simultaneously displaying, on a display of the mobile terminal, the stored deletion history when at least one non-deleted content is displayed, the deletion history is displayed in a form of a list for recognizing a type of deleted data,
   when one of the at least one non-deleted content is selected, executing a function corresponding to a selection of the one of the at least one non-deleted content; and
   when the deletion history is selected, displaying a back-up position information for restoring the deleted content included in the deletion history.

2. The method of claim 1, further comprises receiving a setting of the deletion history of the deleted content, wherein the receiving the setting of the deletion history includes receiving a setting of a deletion history function, and detailed history information regarding content to remain stored on the mobile terminal.

3. The method of claim 2, wherein the detailed history information includes information regarding content and information from a user,
   wherein the information regarding content includes a file name or a file size, an initial position of data, a back-up position of data, and a thumbnail image, and
   wherein the information from a user includes an appreciation review and a number of times of play.

4. The method of claim 2, wherein when the detailed history information is not selected when the deletion history function is set, storing, as a default, a file name, a thumbnail image, capture information, and a back-up position.

5. The method of claim 2, wherein receiving the setting of the deletion history includes:
   displaying a deletion pop-up in response to receiving the deletion command;
   receiving, at the deletion pop-up, the setting of the deletion history function;
   displaying an additional pop-up when the deletion history function is set;
   receiving, at the additional pop-up, a selection from the additional pop-up; and
   setting, as detailed history information, at least one function based on the received selection at the additional pop-up.

6. The method of claim 1, wherein storing the deletion history includes storing the deletion history by linking the deletion history to the deleted content, and wherein the deletion history includes a file name and a thumbnail image.

7. The method of claim 1, wherein the simultaneously displaying the deletion history includes displaying the deletion history in a form of a bundle-type icon when a representative image is displayed, and
   wherein in response to selection of the bundle-type icon, the deleted content is displayed in an unfolded manner.

8. The method of claim 1, wherein the simultaneously displaying the deletion history includes displaying the deletion history as a detailed menu according to a back-up position.

9. The method of claim 1, further comprising:
   receiving a selection from the displayed deletion history;
   displaying at least one deleted content in response to receiving the selection from the displayed deletion history;
   receiving a selection of specific deleted content; and
   in response to receiving the selected specific deleted content, providing information for restoring the selected specific deleted content by displaying detailed history information.

10. A mobile terminal, comprising:
    a display configured to display content;
    a memory configured to store content; and
    a controller configured to:
    delete at least one of the stored content according to a received deletion command,
    store, in the memory, a deletion history of the deleted content, the deletion history includes information for restoring the deleted content,
    simultaneously display, on the display, the stored deletion history when at least one non-deleted content is displayed, the deletion history is displayed in a form of a list for recognizing a type of deleted data,
    when one of the at least one non-deleted content is selected, execute a function corresponding to a selection of the one of the at least one non-deleted content, and
    display a back-up position information for restoring the deleted content included in the deletion history when the deletion history is selected.

11. The mobile terminal of claim 10, wherein the controller receives a user's input indicating whether or not to set a deletion history function, and detailed history information regarding content to remain stored on the mobile terminal.

12. The mobile terminal of claim 11, wherein the detailed history information includes information regarding content and information from a user, wherein the information regarding content includes a file name or a file size, an initial position of data, a back-up position of data, and a thumbnail image, and wherein the information from a user includes an appreciation review and a number of times of play.

13. The mobile terminal of claim 11, wherein when the detailed history information is not selected when the deletion history function is set, the controller stores, as a default, a file name, a thumbnail image, capture information, and a back-up position.

14. The mobile terminal of claim 11, wherein the controller is further configured to:
   display a deletion pop-up in response to receiving the deletion command;
   receive, at the deletion pop-up, the setting of the deletion history function;
   display an additional pop-up for setting detailed history information when the deletion history function is set;
   receive, at the additional pop-up, a selection from information displayed at the additional pop-up; and
   store, as detailed history information, at least one information based on the received selection.

15. The mobile terminal of claim 10, wherein the controller stores the deletion history by linking the deletion history to the deleted content.

16. The mobile terminal of claim 10, wherein when a representative image is displayed, the controller displays the deletion history on one side of the screen, in a form of a bundle-type icon, and
   wherein in response to selection of the bundle-type icon, the controller displays the deleted content in an unfolded manner.

17. The mobile terminal of claim 10, wherein the controller displays the deletion history as a detailed menu according to a back-up position.

18. The mobile terminal of claim 10, wherein the controller is further configured to:
   receive a selection from the displayed deletion history;
   display at least one deleted content in response to receiving the selection from the deletion history;
   receive a selection of specific deleted content; and
   in response to receiving the selection of specific deleted content, provide information for restoring the selected specific deleted content, by displaying detailed history information.

* * * * *